US011920260B2

(12) United States Patent
Hölter et al.

(10) Patent No.: US 11,920,260 B2
(45) Date of Patent: *Mar. 5, 2024

(54) POLYMER COMPOSITION COMPRISING BASIC ADDITIVE, PROCESS AND ARTICLES COMPRISING SAID POLYMER COMPOSITION

(71) Applicant: Rhodia Acetow GmbH, Freiburg (DE)

(72) Inventors: Dirk Hölter, Emmendingen (DE); Philippe Lapersonne, Ebringen (DE)

(73) Assignee: RHODIA ACETOW GMBH, Freiburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,392

(22) Filed: Jun. 3, 2022

(65) Prior Publication Data

US 2022/0290331 A1  Sep. 15, 2022

Related U.S. Application Data

(63) Continuation of application No. 15/534,257, filed as application No. PCT/EP2015/079275 on Dec. 10, 2015, now Pat. No. 11,352,716.

(30) Foreign Application Priority Data

Dec. 11, 2014 (EP) .................................. 14197348

(51) Int. Cl.
| | |
|---|---|
| *D01F 2/28* | (2006.01) |
| *A24D 3/06* | (2006.01) |
| *A24D 3/10* | (2006.01) |
| *B29C 39/00* | (2006.01) |
| *B29K 1/00* | (2006.01) |
| *B29K 105/00* | (2006.01) |
| *B29K 509/00* | (2006.01) |
| *B29L 31/14* | (2006.01) |
| *C08J 3/21* | (2006.01) |
| *C08J 5/18* | (2006.01) |
| *C08K 3/22* | (2006.01) |
| *C08K 3/26* | (2006.01) |
| *C08K 5/092* | (2006.01) |
| *D01F 1/04* | (2006.01) |
| *D01F 1/10* | (2006.01) |

(52) U.S. Cl.
CPC .............. *D01F 2/28* (2013.01); *A24D 3/061* (2013.01); *A24D 3/068* (2013.01); *A24D 3/10* (2013.01); *C08J 3/212* (2013.01); *C08J 5/18* (2013.01); *C08K 3/22* (2013.01); *C08K 3/26* (2013.01); *C08K 5/092* (2013.01); *D01F 1/04* (2013.01); *D01F 1/10* (2013.01); *B29C 39/003* (2013.01); *B29K 2001/12* (2013.01); *B29K 2105/0005* (2013.01); *B29K 2509/00* (2013.01); *B29K 2995/006* (2013.01); *B29L 2031/14* (2013.01); *C08J 2301/10* (2013.01); *C08J 2303/06* (2013.01); *C08J 2367/04* (2013.01); *C08K 2003/222* (2013.01); *C08K 2003/2241* (2013.01); *C08K 2201/018* (2013.01); *D10B 2505/04* (2013.01)

(58) Field of Classification Search
CPC ....................................................... A24D 3/10
See application file for complete search history.

(56) References Cited

U.S. PATENT DOCUMENTS

| | | | |
|---|---|---|---|
| 2,386,659 | A | 10/1945 | Clark |
| 3,802,441 | A | 4/1974 | Hammersmith |
| 4,029,726 | A | 6/1977 | Nichols |
| 4,259,203 | A | 3/1981 | Lorquet |
| 4,298,670 | A | 11/1981 | Murai et al. |
| 5,427,852 | A | 6/1995 | Teufel et al. |
| 6,730,724 | B1 | 5/2004 | Bastiolli et al. |
| 7,160,939 | B2 | 1/2007 | Finnegan et al. |
| 11,352,716 | B2 | 6/2022 | Holter et al. |
| 2002/0096300 | A1 | 7/2002 | Yamashita |
| 2004/0093643 | A1 | 5/2004 | Ensley |
| 2005/0001204 | A1 | 1/2005 | Finnegan et al. |
| 2011/0172326 | A1 | 7/2011 | Weismann et al. |
| 2011/0197642 | A1 | 8/2011 | Rustemeyer et al. |
| 2013/0274373 | A1 | 10/2013 | Yoshikawa et al. |
| 2015/0329689 | A1 | 11/2015 | Huang et al. |

FOREIGN PATENT DOCUMENTS

| | | |
|---|---|---|
| CN | 1138299 A | 12/1996 |
| CN | 103413906 A | 11/2013 |
| CN | 104136011 A | 11/2014 |
| DE | 19804127 A1 | 8/1999 |
| EP | 0394803 B1 | 12/1994 |
| EP | 2551301 A1 | 1/2013 |
| EP | 3162851 A | 5/2017 |
| EP | 3187483 A | 7/2017 |
| FR | 2424298 A1 | 11/1979 |
| GB | 908779 A | 10/1962 |
| JP | S54141839 A | 11/1979 |
| JP | H04146952 A | 5/1992 |
| JP | H5505106 A | 8/1993 |
| JP | H10273582 A | 10/1998 |
| JP | H1157343 A | 3/1999 |
| JP | H11057343 A | 3/1999 |
| JP | 2002161429 A | 6/2002 |

(Continued)

OTHER PUBLICATIONS

Chinese Patent Office Decision of Rejection for Application No. 202011304982.5 dated Feb. 10, 2023 (19 pages including partial English translation).

(Continued)

*Primary Examiner* — Peter F Godenschwager
(74) *Attorney, Agent, or Firm* — MICHAEL BEST & FRIEDRICH LLP

(57) ABSTRACT

The present invention relates to polymer compositions comprising at least one basic additive, and processes comprising at least one process step to obtain the polymer composition or articles comprising the polymer composition. The polymer composition generally displays an enhanced biodegradability.

20 Claims, No Drawings

(56) References Cited

FOREIGN PATENT DOCUMENTS

| | | | |
|---|---|---|---|
| JP | 2006152098 A | 6/2006 |
| JP | 2007169855 A | 7/2007 |
| JP | 2008144010 A | 6/2008 |
| JP | 2008214817 A | 9/2008 |
| JP | 2009292875 A | 12/2009 |
| JP | 2011241236 A | 12/2011 |
| JP | 2012149176 A | 8/2012 |
| JP | 2013237764 A | 11/2013 |
| JP | 2014523962 A | 9/2014 |
| KR | 100227400 B1 | 11/1999 |
| KR | 20100903885 B1 | 6/2009 |
| RU | 2013120288 A | 11/2014 |
| WO | 9410238 A1 | 5/1994 |
| WO | 9949868 A1 | 10/1999 |
| WO | 2010001864 A1 | 1/2010 |
| WO | 2013017431 A1 | 2/2013 |
| WO | 2013101712 A1 | 7/2013 |
| WO | 2013147400 A1 | 10/2013 |
| WO | 2014146912 A1 | 9/2014 |

OTHER PUBLICATIONS

European Patent office Action for Application No. 15808176.0 dated Jul. 6, 2020 (4 pages).
Office Action Issued in Korean Patent Application No. 10-2017-7017933 dated Dec. 29, 2020.
Chinese Patent Office Action for Application No. 201580067414.9 dated Dec. 2, 2019 (13 pages, English translation only).
India Patent Office Examination Report for Application No. 201747023899 dated Dec. 18, 2019 (6 pages).
Japanese Patent Office Action for Application No. 2017-530697 dated Mar. 3, 2020 (6 pages, English translation included).
Canadian Patent Office Examination Report for Application No. 2,967, 157 dated Feb. 6, 2020 (3 pages).
Brazilian Patent Office Action for Application No. BR112017011639-1 dated Feb. 20, 2020.
English translation of Korean Patent Office action for Application No. 10-2017-7017933 dated Dec. 19, 2019 (6 pages).
Russian Patent Office Decision to Grant for Application No. 2017124335/05 dated Jun. 26, 2019 (7 pages, English translation only).
English translation of Japanese Patent Office Action for Application No. 2017-530697 dated May 28, 2019 (6 pages).
Communication Pursuant to Article 94(3) EPC issued in European Application No. 15808176.0 dated Dec. 6, 2018.
Russian Patent Office Action for Application No. 2017124335/05 dated Jan. 25, 2019 (8 pages, English translation only).
National Intellectual Property Administration, P.R. China, First Office Action and Search Report for Application No. 202011304982.5 dated Dec. 13, 2021 (37 pages including English translation).
European Patent Office Examination Report for Application No. 15808176.0 dated Jan. 18, 2022 (3 pages).
Japanese Patent Office Action for Application No. 2020-115283 dated May 25, 2021 (8 pages including brief English summary).
Korean Patent Office Notice of Preliminary Rejection for Application No. 10-2017-7017933 dated Jul. 9, 2021 (11 pages including English translation).
Korean Intellectual Property Office Notice of Preliminary Rejection for Application No. 10-2022-7017525 dated Dec. 30, 2022 (11 pages including English translation).
European Patent Office Examination Report for Application No. 15808176.0 dated Mar. 30, 2023 (3 pages).
Japanese Patent Office Action for Application No. 2022-128105 dated Sep. 26, 2023 (8 pages including English translation).

POLYMER COMPOSITION COMPRISING BASIC ADDITIVE, PROCESS AND ARTICLES COMPRISING SAID POLYMER COMPOSITION

This application claims priority to European application No. EP 14197348.7, the whole content of this application being incorporated herein by reference for all purposes.

The present invention relates to polymer compositions comprising at least one basic additive, and processes comprising at least one process step to obtain the polymer composition or articles comprising the polymer composition.

Articles comprising polymer compositions are omnipresent. Often, articles comprising polymer compositions have a short life cycle and are discarded after use, for example packaging material, binding materials and cigarette filters. Environmental pollution by improper disposal has become a challenge. It is desirable to provide polymer compositions with enhanced biodegradability in order to reduce retention period of polymer pollutants in the environment. It is further desirable to reduce retention times of polymer pollutants in landfills by enhancing the biodegradability of polymer compositions.

WO9410238 discloses a method for increasing the biodegradability of cellulose esters by contacting the cellulose ester with certain basic hydrolysis promoters.

It was found that polymer compositions comprising at least one basic additive, wherein the at least one basic additive has a pH of equal to or less than 13 and equal to or higher than 7 when measured in a 1 wt % solution in water at 20° C., display an enhanced biodegradability over polymer compositions which do not comprise the at least one additive. The effect is particularly advantageous in polymer compositions comprising basic additives with a low solubility. It is thought that the at least one additive rather creates a favourable habitat for the degrading microbes than acting as hydrolysis promoter; a low solubility is advantageous as the additive leaches slowly from the polymer composition, thereby avoiding excessively basic conditions potentially harmful for degrading microbes. Further, a slow leaching of a basic additive with a low solubility provides a longer, stable release of the additive; thus, the effect can be maintained for an extended time period.

The invention therefore concerns a polymer composition comprising at least one polymer and at least one basic additive, wherein the at least one basic additive has a pH of equal to or less than 13 and equal to or higher than 7 when measured in a 1 wt % solution in water at 20° C. The polymer composition generally displays an enhanced biodegradability compared to the polymer composition which does not comprise the at least one additive. The additive thus is an additive which enhances the biodegradability of the polymer composition. The polymer composition can further comprise at least one inhibitor of autocondensation reactions occurring in solvents with at least one carbonyl function and a C—H bond in α-position to said carbonyl function, a reaction which is often occurring under acidic or basic catalysis. Another aspect of the present invention concerns a process for the manufacture of the polymer composition according to the present invention or a process for the manufacture of articles comprising the polymer composition according to the present invention, which comprises at least one step, wherein the at least one step is selected from the group of steps consisting of a) contacting the at least one basic additive and optionally the at least one inhibitor with the at least one polymer in a liquid phase comprising at least one solvent, and subsequently separating the at least one solvent to obtain the polymer composition according to the present invention b) contacting the at least one basic additive and optionally the at least one inhibitor with the at least one polymer in a liquid phase comprising at least one solvent, and subsequently spinning the resulting mixture to obtain fibres comprising the polymer composition, c) contacting the at least one basic additive and optionally the at least one inhibitor with the at least one polymer in a liquid phase comprising at least one solvent, and subsequently applying a film casting process to obtain films comprising the polymer composition, d) contacting the at least one basic additive with the at least one polymer, wherein at least part of the at least one polymer is in molten state, and optionally cooling the mixture to obtain the polymer composition according to the present invention e) contacting the at least one basic additive with the at least one polymer, wherein at least part of the at least one polymer is in molten state, and subsequently extruding and/or film-blowing the obtained mixture to obtain a moulded part, a fibre, a film, a deep-drawn film, an injection-moulded article, a thick-walled moulded part, in particular a flower pot, a granulate, a microbead, a bead or a vessel comprising the polymer composition.

In another aspect, the present invention concerns a filter tow comprising the polymer composition of the present invention, or filter tow comprising fibres manufactured by a process comprising at least one step b) according to the above-mentioned process.

The at least one polymer comprised in the polymer composition according to the present invention is a biodegradable polymer. Often, the at least one polymer is a biopolymer. In particular, the at least one polymer is a polymer based on a polysaccharide, preferably cellulose or starch. Preferably, the at least one polymer is an ester of a polysaccharide. More preferably, the at least one polymer is a cellulose ester selected from the group consisting of cellulose acetate, cellulose propionate, cellulose butyrate, cellulose acetate propionate and cellulose acetate butyrate. Cellulose acetate is most preferred. The average degree of substitution (DS) of the cellulose ester is from 1.5 to 3.0, especially from 2.2 to 2.7, this especially being the case with cellulose acetate. The optimal average degree of polymerization in the cellulose ester is from 150 to 500, especially from 180 to 280. In another aspect, the at least one polymer is selected from the group consisting of polylactide, polycaprolactone and polyhydroxybutyric acid.

According to the present invention «basic additive» is intended to denote an additive which has a pH of equal to or less than 13 and equal to or higher than 7 when measured in a 1 wt % solution in water at 20° C. Generally, the basic additive has a pH of equal to or less than 13 measured in a 1 wt % solution in water at 20° C.; preferably, a pH of equal to or less than 12 measured in a 1 wt % solution in water at 20° C., and most preferably a pH of equal to or less than 11 measured in a 1 wt % solution in water at 20° C. Generally, the basic additive has a pH of equal to or more than 7 measured in a 1 wt % solution in water at 20° C.; preferably, a pH of equal to or more than 7,8 measured in a 1 wt % solution in water at 20° C., and most preferably a pH of equal to or more than 8,5 measured in a 1 wt % solution in water at 20° C. Particularly advantageous is a basic additive with a pH of from 8,5 to 11 measured in a 1 wt % solution in water at 20° C. The pH is measured according to standard procedures, e.g. with a glass pH electrode.

Generally, the at least one basic additive is selected from the group consisting of alkaline earth metal oxides, alkaline earth metal hydroxides, alkaline earth metal carbonates, alkali metal carbonates, alkali metal bicarbonates, ZnO and basic $Al_2O_3$. Preferably, the at least one basic additive is selected from the group consisting of MgO, $Mg(OH)_2$, $MgCO_3$, CaO, $Ca(OH)_2$, $CaCO_3$, $NaHCO_3$, $Na_2CO_3$, $K_2CO_3$, ZnO $KHCO_3$ and basic $Al_2O_3$. In another preferred aspect, the at least one basic additive is selected from the group consisting of MgO, $Mg(OH)_2$, $MgCO_3$, CaO, $Ca(OH)_2$, $NaHCO_3$, $K_2CO_3$, ZnO, $KHCO_3$ and basic $Al_2O_3$. More preferably, the at least one basic additive is selected from the group consisting of MgO, $Mg(OH)_2$, CaO, $Ca(OH)_2$, ZnO, and basic $Al_2O_3$. In one aspect, alkaline earth metal oxides, ZnO and basic $Al_2O_3$ are particularly preferred as basic additive; thus, the at least one basic additive is more preferably selected from the group consisting of MgO, ZnO, CaO and $Al_2O_3$, and even more preferably from the group consisting of MgO, CaO and ZnO. MgO is the most preferred basic additive.

Often, the at least one basic additive has a solubility of from $10^{-5}$ to 70 g/100 mL water at 20° C. Generally, the at least one basic additive has a solubility of equal to or more than $10^{-6}$ g/100 mL water at 20° C. Preferably, the at least one basic additive has a solubility of equal to or more than $10^{-5}$ g/100 mL water at 20° C. Most preferably, the at least one basic additive has a solubility of equal to or more than $10^{-4}$ g/100 mL water at 20° C. Generally, the at least one basic additive has a solubility of equal to or less than 70 g/100 mL water at 20° C. Preferably, the at least one basic additive has a solubility of equal to or less than 10 g/100 mL water at 20° C. More preferably, the at least one basic additive has a solubility of equal to or less than 1 g/100 mL water at 20° C. Most preferably, the at least one basic additive has a solubility of equal to or less than 0.1 g/100 mL water at 20° C. Examples for additives with a solubility of about $10^{-4}$ g/100 mL (20° C.) in water are MgO, ZnO and $Mg(OH)_2$. One example for an additive with a solubility of about $10^{-2}$ g/100 mL (20° C.) in water is $MgCO_3$. Examples for additives with a solubility of about 0.1 g/100 mL (20° C.) in water are CaO and $Ca(OH)_2$.

In another aspect, the at least one basic additive often is selected from the group consisting of $K_2CO_3$ and basic $Al_2O_3$.

Generally, the at least one basic additive is present in the polymer composition in the form of finely distributed particles.

In one embodiment of the present invention, the at least one basic additive is present in the polymer composition in the form of finely distributed particles, wherein the D90 particle size is equal to or less than 10 μm. More preferably, the D90 particle size of the finely distributed basic additive is equal to or less than 5 μm. More preferably, the D90 particle size of the finely distributed basic additive is equal to or less than 3 μm. A particle size of equal to or less than 2 μm is most preferred. Generally, a lower limit of the D90 particle size of the at least one basic additive is not critical to the present invention. Particles of the described particle size can be obtained according to procedures known to the person skilled in the art, for example wet or dry grinding in a mill, for example a ball or bead mill such as a WAB Dyno® Mill Multi Lab. The particles may also be obtained by grinding the additive in the presence of other additives, such as pigments, fillers or colorants. The D90 particle size can preferably be determined by laser diffraction, for example with a laser diffraction sensor such as Helos® BR.

In one embodiment of the present invention, the at least one basic additive is present in the polymer composition in the form of finely distributed particles in an amount of from 0.01 to 40 wt %. The term «wt %» relates to the weight of the total polymer composition, including, for example, other additives such as such as pigments, fillers or colorants. Often, the at least one basic additive is present in the polymer composition in the form of finely distributed particles in an amount of equal to or more than 0.01 wt %. Preferably, the at least one basic additive is present in the polymer composition in the form of finely distributed particles in an amount of equal to or more than 0.05 wt %. Most preferably, the at least one basic additive is present in the polymer composition in the form of finely distributed particles in an amount of equal to or more than 0.1 wt %. Often, the at least one basic additive is present in the polymer composition in the form of finely distributed particles in an amount of equal to or less than 40 wt %. Preferably, the at least one basic additive is present in the polymer composition in the form of finely distributed particles in an amount of equal to or less than 30 wt %. More preferably, the at least one basic additive is present in the polymer composition in the form of finely distributed particles in an amount of equal to or less than 20 wt %. Even more preferably, the at least one basic additive is present in the polymer composition in the form of finely distributed particles in an amount of equal to or less than 10 wt %. Most preferably, the at least one basic additive is present in the polymer composition in the form of finely distributed particles in an amount of equal to or less than 8 wt %.

In one embodiment of the present invention, the polymer composition comprises, besides the at least one additive, at least one inhibitor of autocondensation reactions occurring in solvents with at least one carbonyl function and a C—H bond in α-position to said carbonyl function. It has been observed that the advantageous effect of the at least one basic additive on the enhanced biodegradability can be accompanied by a catalytic effect of the at least one basic additive on solvents with at least one carbonyl function and a C—H bond in α-position to said carbonyl function which can be present in the further processing of the polymer composition, which may undergo autocondensation in the presence of the at least one basic additive. Autocondensation can, for example, be observed in a filter tow spinning process, wherein the polymer composition comprising the at least one basic additive is processed in the presence of acetone. Autocondensation products, such as diacetone alcohol from acetone, advantageously should be avoided in the processing of polymer compositions. Solvents often present in the processing of the polymer composition are solvents with at least one carbonyl function and a C—H bond in α-position to said carbonyl function, for example ketones, more particularly a C3-C6 ketone, and most particularly acetone. Preferably, the at least one inhibitor is selected from the group consisting of carboxylic acids and alcohols. More preferably the inhibitor is selected from the group consisting of citric acid, lactic acid, malic acid, tartaric acid and glycerol. Citric acid is the most preferred inhibitor. In one aspect, at least one inhibitor is present in the polymer composition in an amount of from 0.001 to 10 wt %. Generally, the at least one inhibitor is present in the polymer composition in an amount of equal to or more than 0.001 wt %. The term «wt %» relates to the weight of the total polymer composition. Preferably, the at least one inhibitor is present in the polymer composition in an amount of equal to or more than 0.01 wt %. Most preferably, the at least one inhibitor is present in the polymer composition in an amount of equal to or more than 0.1 wt %. Generally, the at least one inhibitor is present in the polymer composition in an amount of equal to or less than 10 wt %. Preferably, the at least one inhibitor is present in the polymer composition in an amount of equal to or less than 5 wt %. More preferably, the at least one inhibitor is present in the polymer composition in an amount of equal to or less than 1 wt %. An amount of equal to or less than 0.5 wt % of inhibitor is most preferred. In one aspect, the at least one inhibitor is present in the polymer composition in the form of finely distributed particles, wherein the D90 particle size is equal to or less than 10 µm. More preferably, the D90 particle size of the finely distributed inhibitor is equal to or less than 5 µm. More preferably, the D90 particle size of the finely distributed inhibitor is equal to or less than 3 µm. A particle size of equal to or less than 2 µm is most preferred. Generally, a lower limit of the D90 particle size of the at least one inhibitor is not critical to the present invention. Particles of the correct particle size can be obtained according to procedures known to the person skilled in the art, for example wet or dry grinding in a mill, for example a bead mill such as a WAB Dyno® Mill Multi Lab. The particles may also be obtained by grinding the inhibitor in the presence of other additives, such as the at least one basic additive, pigments or colorants. The D90 particle size of the at least one inhibitor can preferably be determined by laser diffraction, for example with a laser diffraction sensor such as Helos® BR The particle size of any other additive, such as pigments or colorants, should be in the same range as the inhibitor and/or basic additive. The 90 particle size of any other additive is preferably determined by laser diffraction as described above.

In another aspect, the at least one inhibitor is present in the polymer composition mixture comprising at least one solvent in solution. The at least inhibitor often precipitates when the solvent is removed and is then present in the polymer composition in the form of finely divided particles which are also denoted as "domain" or "phase".
In yet another aspect, the at least one inhibitor is a substance which is soluble in the polymer composition mixture comprising at least one solvent and/or the polymer composition.

The polymer composition comprising at least one basic additive generally displays an enhanced biodegradability. In one aspect, the term «enhanced biodegradability» intends to denote a biodegradability which is measured by determining the resistance of cellulose-containing textiles against microorganisms according to the procedure of DIN specification EN ISO11721-1. When measured according to DIN specification EN ISO11721-1, «enhanced biodegradability» denotes an increase of average weight loss of the polymer composition in the soil burying test after 2 months of equal to or more than 10% absolute, preferably equal to or more than 13% absolute, and most preferably equal to or more than 15% absolute compared to the biodegradability of the polymer composition without basic additive. In another aspect, the term «enhanced biodegradability intends to denote a biodegradability which is measured by determining the aquatic aerobic biodegradation by $O_2$ consumption according to the procedure of specification ISO 14851. When measured according to specification ISO 14851, «enhanced biodegradability» denotes an increase biodegradation as determined by $O_2$ consumption of the polymer composition in the aquatic aerobic biodegradation after 28 days of equal to or more than two time higher, preferably equal to or more than three times higher, and most preferably equal to or more than four times higher compared to the polymer composition without basic additive. The polymer composition according to the present invention generally displays an enhanced biodegradability in comparison to polymer compositions not comprising the basic additive according to the present invention.

Another embodiment of the present invention concerns a process for the manufacture of a polymer composition comprising at least one basic additive and optionally an inhibitor, or a process for the manufacture of articles comprising such a polymer composition, which comprises at least one step, wherein the at least one step is selected from the group of steps consisting of a) contacting the at least one basic additive and optionally the at least one inhibitor with the at least one polymer in a liquid phase comprising at least one solvent, and subsequently separating the at least one solvent to obtain the polymer composition according to the present invention b) contacting the at least one basic additive and optionally the at least one inhibitor with the at least one polymer in a liquid phase comprising a solvent, and subsequently spinning the resulting mixture to obtain fibres comprising the polymer composition, c) contacting the at least one basic additive and optionally the at least one inhibitor with the at least one polymer in a liquid phase comprising at least one solvent, and wherein the resulting mixture subsequently is processed in a film producing process, preferably the film casting method, to obtain films comprising the polymer composition, d) contacting the at least one basic additive with the at least one polymer, wherein at least part of the at least one polymer is in molten state, and optionally cooling the mixture, to obtain the polymer composition according to the present invention and e) contacting the at least one basic additive with the at least one polymer, wherein at least part of the at least one polymer is in molten state, and subsequently extruding and/or film-blowing the mixture to obtain a moulded part, a fibre, a film, a deep-drawn film, an injection-moulded article, a thick-walled moulded part, a granulate, a microbead, a bead, a vessel or a flower pot comprising the polymer composition.

One embodiment of the present invention concerns a process for the manufacture of a polymer composition comprising at least one basic additive and optionally an inhibitor, or a process for the manufacture of articles comprising such a polymer composition, wherein the process comprises one step wherein the at least one basic additive and optionally the at least one inhibitor are contacted with the at least one polymer in a liquid phase comprising at least one solvent, and subsequently separating the at least one solvent to obtain the polymer composition according to the present invention. In one aspect, the at least one solvent is a solvent with at least one carbonyl function and a C—H bond in α-position to said carbonyl function. Often, the at least one solvent is a ketone, more particularly a C3-C6 ketone, and most particularly acetone. In one aspect of this embodiment, the at least one polymer is dissolved in the at least one solvent, preferably at a temperature of from 10 to 60° C., and the at least one basic inhibitor and optionally the at least one inhibitor are added. In another aspect of the present invention, the at least one solvent is selected from the group consisting of ethers, alcohols and carboxylic acid esters, such as ethyl acetate, isopropanol, ethyl alcohol and ethyl ether. If no solvent with at least one carbonyl function and a C—H bond in α-position to said carbonyl function is present, the optional inhibitor generally is not present. In a preferred aspect of this embodiment, from 5 to 90 parts by weight of the polymer, preferably cellulose acetate, is dissolved in from 10 to 95 parts by weight of solvent, preferably acetone, and the mixture subsequently is contacted with 0.01 to 40 wt % of basic additive, wherein «wt %» relates to the weight of polymer and additive. When the polymer is a cellulose ester, in particular cellulose acetate, it is preferred that the cellulose ester has a DS of from 1.5 to 3.0, especially from 2.2 to 2.7. Optionally, the mixture is further contacted with from 0.001 to 10 wt % of inhibitor, wherein «wt %» is relative to the combined weight of the polymer, inhibitor and basic additive. In another aspect, the mixture can further be contacted with other components, such as pigments and colorants. A preferred pigment which can be present is TiO2. Generally, the basic additive can be treated before contacted with the polymer in the solvent by wet or dry milling, preferably wet milling, in the presence of the at least one solvent, and optionally in the presence of other additives, such as inhibitor and/or pigments and/or colorants. Often, the milling is carried out in a ball mill. In another aspect, the basic additive is ground in the presence of the polymer, preferably in a wet milling procedure, optionally in the presence of at least one of the inhibitor, the pigment and/or the colorant. By this, re-agglomeration of the basic additive can be avoided. The mixture of at least one polymer, at least one solvent, at least one basic additive, optionally at least one inhibitor, colorant, pigment and other additives is then subjected to a step of separating the solvent to obtain the polymer composition according to the present invention. The step of separating the solvent often is performed by applying at least one procedures selected from the group consisting of heating, applying vacuum and applying an air stream to the mixture.

Another embodiment of the present invention concerns a process for the manufacture of a polymer composition comprising at least one basic additive and optionally an inhibitor, or a process for the manufacture of articles comprising such a polymer composition, wherein the process comprises one step wherein the at least one basic additive and optionally the at least one inhibitor are contacted with the at least one polymer in a liquid phase comprising at least one solvent, and subsequently spinning the resulting mixture to obtain fibres comprising the polymer composition. Preferred conditions for obtaining the mixture comprising the at least one polymer, the at least one basic additive and other optional additives and the at least one solvent are set forth in the foregoing embodiment. The mixture can then be submitted to a spinning process, preferably a dry spinning process, to obtain fibres comprising the polymer composition according to the present invention. Details of dry spinning technique are known to the person skilled in the art, and described, for example, in «Bio-Based Polymer: Materials and Applications», S. Kabasci (Ed.), p. 49 ff., Wiley 2014 and «Cellulose Acetates: Properties and Applications", Macromolecular Symposia, Volume 208, Issue 1, p. 267-292, Wiley, 2004. Both references are incorporated hereby by reference in their entirety.

A further embodiment of the invention concerns a process for the manufacture of a polymer composition comprising at least one basic additive and optionally an inhibitor, or a process for the manufacture of articles comprising such a polymer composition, wherein the process comprises one step wherein the at least one basic additive and optionally the at least one inhibitor is contacted with the at least one polymer in a liquid phase comprising at least one solvent, and wherein the resulting mixture subsequently is processed in a film producing process, preferably the film casting method, to obtain films comprising the polymer composition. In one aspect, the at least one solvent is a solvent with at least one carbonyl function and a C—H bond in α-position to said carbonyl function. Often, the at least one solvent is a ketone, more particularly a C3-C6 ketone, and most particularly acetone. In one aspect of this embodiment, the at least one polymer is dissolved in the at least one solvent, preferably at a temperature of from 10 to 60° C., and the at least one basic additive and optionally the at least one inhibitor are added. In another aspect of the present invention, the at least one solvent is selected from the group consisting of ethers, alcohols and carboxylic acid esters, such as ethyl acetate, isopropanol, ethyl alcohol and ethyl ether. If no solvent with at least one carbonyl function and a C—H bond in α-position to said carbonyl function is present, the optional inhibitor generally is not present. The resulting mixture is subjected to a film casting procedure, to obtain films comprising the polymer composition. In a preferred aspect of this embodiment, from 5 to 30 parts by weight of the polymer, preferably cellulose acetate, is dissolved in from 70 to 95 parts by weight of solvent, preferably acetone, and the solution subsequently is contacted with 0.01 to 40 wt % of basic additive, wherein «wt %» relates to the weight of polymer and additive. When the polymer is a cellulose ester, in particular cellulose acetate, it is preferred that the cellulose ester has a DS of from 1.5 to 3.0, especially from 2.2 to 2.7. Optionally, the mixture is further contacted with from 0.001 to 10 wt % of inhibitor, wherein «wt %» is relative to the combined weight of the polymer, inhibitor and basic additive. In another aspect, the mixture can further be contacted with other at least one other component, which can, for example, be selected from the group comprising plasticizers, pigments and colorants. A preferred pigment which can be present is $TiO_2$. Generally, the basic additive can be treated before being contacted with the polymer in the solvent by wet or dry milling, preferably wet milling, in the presence of the at least one solvent, and optionally in the presence of other additives, such as inhibitor and/or plasticizer and/or pigments and/or colorants. Often, the milling is carried out in a ball mill. In another aspect, the basic additive is ground in a wet or dry grinding procedure in the presence of the polymer, preferably in a wet milling procedure, optionally in the presence of at least one of the inhibitor, the pigment and/or the colorant. By this, re-agglomeration of the basic additive can be avoided. The technical details of various casting procedures are known to the person skilled in the art, for example described in «Industrial Plastics: Theory and Applications», E. Lokensgard, 5th Ed., 2010, Delmar, and can be applied to the film casting process according to the present invention. The reference is hereby incorporated by reference in its entirety.

A further embodiment of the invention concerns a process for the manufacture of a polymer composition comprising at least one basic additive, or a process for the manufacture of articles comprising such a polymer composition, wherein the process comprises one step wherein the at least one basic additive is contacted with the at least one polymer, wherein at least part of the at least one polymer is in molten state, and optionally cooling the mixture, to obtain the polymer composition according to the present invention. In one aspect of the present invention, a wet grinding of the at least one basic additive and optionally the inhibitor and other optional additives, is firstly carried out, in a water-free solvent in a ball mill. A first fraction of polymer can be present during the grinding. The polymer fraction is then slightly increased and the suspension dried, for example, on a roller dryer or spray dryer. If the polymer is not soluble in common solvents, such as acetone, ethyl acetate, butyl acetate, etc., the solids to be ground can, for example, be ground in acetone and stabilised with 1 to 5% cellulose acetate to obtain a dope mixture comprising the basic additive. In another aspect, the at least one basic additive is dry milled, optionally with a fraction of polymer, optionally in a fraction comprising a different polymer, and further optionally in the presence of another additive, such as a anti-conglomeration additive, to obtain a dope mixture comprising the basic additive. In yet another aspect, the basic additive is milled in the presence of at least one plasticizer, to obtain a dope mixture. The dope mixture obtained can then be homogeneously distributed as the master batch together with the at least one polymer in the molten state to obtain, optionally after cooling, the polymer composition according to the present invention. Alternatively, the completely ground suspension can be incorporated in the matrix polymer in a kneading machine, then dried and formed again like normal granulate in melt.

A further embodiment of the invention concerns a process for the manufacture of a polymer composition comprising at least one basic additive and optionally an inhibitor, or a process for the manufacture of articles comprising such a polymer composition, wherein the process comprises one step wherein the at least one basic additive and optionally the at least one inhibitor is contacted with the at least one polymer, wherein at least part of the at least one polymer is in molten state, and subsequently extruding and/or moulding and/or film-blowing the mixture to obtain a moulded part, a fibre, a film, a deep-drawn film, an injection-moulded article, a thick-walled moulded part, a granulate, a microbead, a bead, a vessel or a flower pot comprising the polymer composition. The technical details of various extrusion, moulding and film blowing procedures are known to the person skilled in the art, for example described in «Industrial Plastics: Theory and Applications», E. Lokensgard, 5th Ed., 2010, Delmar, and can be applied to the processes according to the present invention. In one aspect of the present invention, a wet grinding of the at least one basic additive and optionally the inhibitor and other optional additives, is firstly carried out, in a water-free solvent in a ball mill. A first fraction of polymer can be present during the grinding. The polymer fraction is then slightly increased and the suspension dried, for example, on a roller dryer or spray dryer. If the polymer is not soluble in common solvents, such as acetone, ethyl acetate, butyl acetate, etc., the solids to be ground can, for example, be ground in acetone and stabilised with 1 to 5% cellulose acetate to obtain a dope mixture comprising the basic additive. In another aspect, the at least one basic additive is dry milled, optionally with a fraction of polymer, optionally in a fraction comprising a different polymer, and further optionally in the presence of another additive, such as a anti-conglomeration additive, to obtain a dope mixture comprising the basic additive. In yet another aspect, the basic additive is milled in the presence of at least one plasticizer, to obtain a dope mixture. The dope mixture obtained can then be homogeneously distributed as the master batch together with the polymers in the mixing zone of an extruder. Alternatively, the completely ground suspension can be incorporated in the matrix polymer in a kneading machine, then dried if the dope mixture comprises solvents and formed again like normal granulate in melt. Molten polymer compositions obtained by contacting the at least one polymer, the at least one basic additive, optionally the inhibitor and further additives, under elevated temperatures can be subjected to moulding, extruding and/or film-blowing according to process details known to the person skilled in the art, and described, for example, in «Industrial Plastics: Theory and Applications», E. Lokensgard, 5th Ed., 2010, Delmar.

Another embodiment of the present invention concerns filter tow comprising the polymer composition according to the present invention as set forth above, in particular filter tow wherein the polymer composition comprises at least one basic additive, at least one inhibitor and a pigment. A polymer composition comprising MgO, citric acid and $TiO_2$ is preferred. Another preferred polymer composition comprises MgO and no inhibitor. Another aspect of the present invention is filter tow comprising fibres manufactured by a process comprising at least one step b) described above.

Should the disclosure of publications which are incorporated herein by reference conflict with the description of the present application to the extent that it may render a term unclear, the present description shall take precedence.

The examples which follow are intended to illustrate the present invention without, however, limiting the scope thereof.

EXAMPLE 1—DEGRADABILITY OF CAST FILMS

Films were made by dissolving cellulose acetate DS 2.45 in acetone and adding the basic additive and optionally the inhibitor. The resulting mixture was submitted to a film casting procedure using an automated film applicator. The films were dried, cut to pieces (6.5 cm×6.5 cm), the pieces were mounted in frames, and buried in soil according to EN ISO 11721-1. After 1 and after 2 months the specimens were retrieved from soil, carefully cleaned from coarse deposits and checked for weight and visually for missing area. Each reported weight loss and missing are, respectively, is an average of 6 films and related to the parts of the film which was in contact with the soil Film A: from 15 parts cellulose acetate and 85 parts acetone (comparative example)

Film B: from 15 parts cellulose acetate, 85 parts acetone, 0.79 parts MgO (resulting in 5 wt % MgO in final product)

Film C: from 15 parts cellulose acetate, 85 parts acetone, 0.38 parts MgO (resulting in 2.5 wt % MgO in final product)

Film D: from 15 parts cellulose acetate, 85 parts acetone, 0.79 parts MgO (resulting in 5 wt % MgO in final product) and 0.08 parts citric acid (resulting in 0.5 wt % citric acid in final product)

TABLE 1

Degradability as determined by EN ISO 11721-1.

| Film | MgO (wt %) | Citric Acid (wt %) | Average weight loss (%) | | Average missing area (%) | |
|---|---|---|---|---|---|---|
| | | | 1 month | 2 months | 1 month | 2 months |
| A | 0 | 0 | 0 | 0 | 0 | 0 |
| B | 5 | 0 | 13 | 29 | 29 | 49 |
| C | 2.5 | 0 | 3 | 16 | 12 | 28 |
| D | 5 | 0.5 | 16 | 26 | 32 | 45 |

EXAMPLE 2—DEGRADABILITY OF SPUN FIBRES

Spinning solutions were manufactured by mixing cellulose acetate (DS 2.45) and acetone, and spun to 1.9 denier filaments with a Y-cross-section using the dry spinning method. The filaments were milled and subjected to an aquatic aerobic biodegradation test according to ISO 14851. The biodegradation was determined by measurement of the $O_2$ consumption.

Filament A (comparative): Spinning solution from 26.9 parts of cellulose acetate and 0.1 parts $TiO_2$ in 73 parts acetone.

Filament B: Spinning solution from 25.6 parts of cellulose acetate, 1.35 parts MgO (resulting in 5 wt % in the final product), 0.07 parts citric acid (resulting in 0.25 wt % in the final product) and 0.1 parts $TiO_2$ in 73 parts acetone.

TABLE 2

Degradability as determined by ISO 14851

| Filament | MgO (wt %) | Citric Acid (wt %) | Bindegradation (%) after 28 days | Biodegradation (%) after 56 days |
|---|---|---|---|---|
| A | 0 | 0 | 8 | 12 |
| B | 5 | 0.25 | 60 | 87 |

The invention claimed is:

1. A fiber of filter tow comprising a polymer composition comprising at least one polymer and at least one basic additive, wherein the at least one basic additive has a pH of equal to or less than 13 and equal to or higher than 7 when measured in a 1 wt.-% solution in water at 20° C., wherein the at least one basic additive is present in the polymer composition in the form of finely distributed particles.

2. The fiber of filter tow according to claim 1, wherein the at least one polymer in the polymer composition is selected from the group consisting of polysaccharide esters.

3. The fiber of filter tow according to claim 2, wherein the polysaccharide ester is cellulose ester, starch ester, or combinations thereof.

4. The fiber of filter tow according to claim 1, wherein the at least one polymer in the polymer composition is a cellulose ester, and wherein the at least one cellulose ester is selected from the group consisting of cellulose acetate, cellulose propionate, cellulose butyrate, cellulose acetate propionate, and cellulose acetate butyrate.

5. The fiber of filter tow according to claim 1, wherein the at least one basic additive in the polymer composition is selected from the group consisting of alkaline earth metal oxides, alkaline earth metal hydroxides, alkaline earth metal carbonates, alkali metal carbonates, alkali metal bicarbonates, ZnO, and basic $Al_2O_3$.

6. The fiber of filter tow according to claim 1, wherein the at least one basic additive in the polymer composition has a solubility of from $10^{-6}$ to 70 g/100 mL water at 20° C.

7. The fiber of filter tow according to claim 1, wherein the at least one basic additive in the polymer composition is selected from the group consisting of MgO, $Mg(OH)_2$, $MgCO_3$, CaO, $Ca(OH)_2$, $CaCO_3$, $NaHCO_3$, ZnO, $Na_2CO_3$, and $KHCO_3$.

8. The fiber of filter tow according to claim 1, wherein the at least one basic additive in the polymer composition is selected from the group $K_2CO_3$ and basic $Al_2O_3$.

9. The fiber of filter tow according to claim 1, wherein the fiber of filter tow is prepared by spinning solution comprising at least one polymer and at least one basic additive to filaments and the filaments are further processed to fibers or filter tow.

10. The fiber of filter tow according to claim 9, wherein the distributed particles have a D90 particle size that is equal to or less than 10 μm.

11. The fiber of filter tow according to claim 1, wherein the at least one basic additive is present in the polymer composition in the form of finely distributed particles in an amount of from 0.01 to 40 wt. %.

12. The fiber of filter tow according to claim 1, wherein the polymer composition further comprises at least one inhibitor of autocondensation reactions occurring in solvents with at least one carbonyl function and a C—H bond in a-position to said carbonyl function.

13. The fiber of filter tow according to claim 12, wherein the at least one inhibitor is selected from the group consisting of carboxylic acids and alcohols.

14. The fiber of filter tow according to claim 12, wherein the at least one inhibitor is selected from the group consisting of citric acid, lactic acid, malic acid, tartaric acid, and glycerol.

15. The fiber of filter tow according to claim 12, wherein the at least one inhibitor present in the polymer composition is in an amount of from 0.001 to 10 wt. %.

16. The fiber of filter tow according to claim 1, wherein the at least one basic additive in the polymer composition is selected from the group consisting of alkaline earth metal oxides, alkaline earth metal hydroxides, alkaline earth metal carbonates, alkali metal bicarbonates, and basic $Al_2O_3$.

17. The fiber of filter tow according to claim 1, wherein the at least one basic additive in the polymer composition is selected from the group consisting of alkaline earth metal oxides, alkaline earth metal hydroxides, alkali metal carbonates, and basic $Al_2O_3$.

18. The fiber of filter tow according to claim 1, wherein the polymer composition does not include ZnO as a basic additive.

19. A process for making the fiber of filter tow according to claim 10, the process comprising at least one step wherein the at least one step is selected from the group of steps comprising: a) contacting the at least one basic additive and optionally the at least one inhibitor with the at least one polymer in a liquid phase comprising at least one solvent, and subsequently spinning the resulting mixture to obtain fibers comprising the polymer composition, or b) contacting the at least one basic additive with the at least one polymer, wherein at least part of the at least one polymer is in molten state, and subsequently extruding and/or film-blowing the mixture to obtain a fiber.

20. A filter tow comprising fibers of the composition made by the process according to claim 19.

* * * * *